United States Patent
Beaulieu (10) Patent No.: US 10,989,361 B2
(45) Date of Patent: Apr. 27, 2021

(54) FUEL TANK AND METHODS

(71) Applicant: ATELIER GERARD BEAULIEU INC., St. Quentin (CA)

(72) Inventor: Marc Beaulieu, St. Quentin (CA)

(73) Assignee: ATELIER GERARD BEAULIEU INC., St. Quentin (CA)

( * ) Notice: Subject to any disclaimer, the term of this patent is extended or adjusted under 35 U.S.C. 154(b) by 0 days.

(21) Appl. No.: 16/460,262

(22) Filed: Jul. 2, 2019

(65) Prior Publication Data
US 2020/0011484 A1 Jan. 9, 2020

Related U.S. Application Data

(60) Provisional application No. 62/763,827, filed on Jul. 5, 2018.

(51) Int. Cl.
*F17C 13/04* (2006.01)

(52) U.S. Cl.
CPC ...... *F17C 13/04* (2013.01); *F17C 2205/0176* (2013.01); *F17C 2260/036* (2013.01)

(58) Field of Classification Search
CPC .............. F17C 13/04; F17C 2205/0176; F17C 2260/036; B60K 2015/0496; B60K 2015/03368; B60K 15/03; B60Y 2200/147
USPC .......................................................... 141/1
See application file for complete search history.

(56) References Cited

U.S. PATENT DOCUMENTS

| 1,352,792 | A | * | 9/1920 | Day | B60P 3/24 220/86.1 |
| 1,522,612 | A | * | 1/1925 | Burchett | F02B 63/04 290/1 A |
| 2,056,179 | A | * | 10/1936 | Fitch | B60P 3/22 410/68 |
| 2,703,607 | A | * | 3/1955 | Simmonds | B64D 37/08 137/265 |
| 4,013,105 | A | * | 3/1977 | Uuskallio | B60K 15/04 141/86 |
| 4,166,550 | A | * | 9/1979 | Kleinschmit | B60K 15/03504 137/43 |
| 4,261,477 | A | * | 4/1981 | Casimir | B60K 15/03504 220/501 |
| 4,278,115 | A | * | 7/1981 | Briles | B65D 90/105 137/312 |
| 4,457,443 | A | * | 7/1984 | Casimir | B60K 15/03504 220/500 |

(Continued)

OTHER PUBLICATIONS

Base Mounted Fuel Tanks, https://www.americasgenerators.com/Base-Mounted-Fuel-Tanks-Americas-Generators.aspx, Sep. 23, 2019.

(Continued)

*Primary Examiner* — Timothy L Maust
*Assistant Examiner* — James R Hakomaki
(74) *Attorney, Agent, or Firm* — Norton Rose Fulbright Canada LLP (57) ABSTRACT

A fuel tank includes a body defining a fuel holding cavity therein, a spill box attached to the body, a fill port for fluid communication with the fuel holding cavity, the fill port being disposed within the spill box, and an accumulation box disposed on a top of the body and defining a fuel overflow cavity therein that is in fluid communication with the fuel holding cavity. Methods of retrofitting a fuel tank and venting a fuel tank are also described.

20 Claims, 7 Drawing Sheets

(56) References Cited

U.S. PATENT DOCUMENTS

| | | | | |
|---|---|---|---|---|
| 4,520,852 | A * | 6/1985 | Klein | B67D 7/06 137/312 |
| 4,592,386 | A * | 6/1986 | Mooney | B65D 90/26 137/588 |
| 4,615,362 | A * | 10/1986 | Hartman | B65D 90/26 141/86 |
| 4,807,675 | A * | 2/1989 | Sharp | B65D 90/105 137/547 |
| 4,960,222 | A | 10/1990 | Fields, III | |
| 4,986,436 | A * | 1/1991 | Bambacigno | B65D 90/24 141/86 |
| 5,058,633 | A * | 10/1991 | Sharp | B65D 90/105 137/312 |
| 5,082,034 | A * | 1/1992 | Soper | B67D 7/78 137/264 |
| 5,088,530 | A * | 2/1992 | Harp | B65D 90/24 141/86 |
| 5,114,046 | A * | 5/1992 | Bryant | B60S 5/02 137/234.6 |
| 5,346,093 | A * | 9/1994 | De Benedittis | B65D 90/24 220/4.12 |
| 5,381,923 | A * | 1/1995 | O'Dea | B65D 90/24 220/4.12 |
| 5,538,052 | A * | 7/1996 | Harp | B65D 90/24 141/311 A |
| 5,620,111 | A * | 4/1997 | Gehman | B65D 88/12 220/4.12 |
| 5,769,109 | A * | 6/1998 | Stanton | B65D 90/105 137/264 |
| 5,884,709 | A * | 3/1999 | Evans | A62C 3/06 169/46 |
| 5,950,688 | A * | 9/1999 | Langlois | B63B 25/082 141/1 |
| 5,975,132 | A * | 11/1999 | Gleeson | B60S 5/02 137/234.6 |
| 6,024,242 | A * | 2/2000 | Stevenson | B65D 90/10 220/4.12 |
| 6,250,345 | B1 * | 6/2001 | Allwein | B65D 90/24 141/311 A |
| 6,276,387 | B1 * | 8/2001 | Pachciarz | B60K 15/035 123/516 |
| 6,302,166 | B1 * | 10/2001 | Caparros | B65D 90/10 141/311 A |
| 6,349,752 | B1 * | 2/2002 | Roberts, Jr. | B63B 11/04 141/311 A |
| 6,520,124 | B2 | 2/2003 | Bohm, II | |
| 6,601,542 | B2 * | 8/2003 | Campion | F02B 63/04 123/2 |
| 6,655,418 | B1 * | 12/2003 | McGill | B65D 88/76 141/1 |
| 6,935,161 | B2 * | 8/2005 | Hutchinson | B67D 7/3209 73/40.5 R |
| 7,246,717 | B2 * | 7/2007 | Rodgers | B65D 90/028 206/319 |
| 8,495,869 | B2 * | 7/2013 | Beissler | F02B 63/04 60/301 |
| 8,511,341 | B2 * | 8/2013 | Johnston | B60K 15/03 114/289 |
| 9,371,953 | B2 * | 6/2016 | Spratt | F16M 5/00 |
| 9,453,583 | B1 * | 9/2016 | Boucher, II | F16K 24/042 |
| 2003/0024934 | A1 * | 2/2003 | Moore | F17C 13/00 220/560.03 |
| 2003/0205272 | A1 * | 11/2003 | Benjey | F16K 24/042 137/202 |
| 2005/0205153 | A1 * | 9/2005 | MacDonald | B08B 17/00 141/86 |
| 2007/0152126 | A1 * | 7/2007 | Graham | F16M 1/00 248/678 |
| 2009/0006026 | A1 * | 1/2009 | Clover | B67D 7/3209 702/127 |
| 2010/0116354 | A1 * | 5/2010 | Rowe | B65D 90/105 137/312 |
| 2011/0030951 | A1 * | 2/2011 | Irvine | E21B 37/08 166/278 |
| 2014/0360625 | A1 * | 12/2014 | Williamson | B67D 7/362 141/94 |

OTHER PUBLICATIONS

Fuel Tank for Power Generators, http://www.hennig-enclosure-systems.com/index.php/fuel-tanks/, Apr. 25, 2019.

* cited by examiner

FUEL TANK AND METHODS

CROSS-REFERENCE TO RELATED APPLICATIONS

This application claims priority from U.S. patent application 62/763,827 filed on Jul. 5, 2018. Its content is incorporated herewith in its entirety.

TECHNICAL FIELD

This disclosure relates to fuel tanks for generators.

BACKGROUND

Prior art fuel tanks for generators are known, and are suitable for their intended purposes. However, prior art fuel tanks have certain drawbacks. For example, at least some prior art fuel tanks, when tilted or subjected to a rising temperature when filled with fuel, may cause at least some of the fuel to spill out of a fill port. Therefore, improvements to prior art fuel tanks are desirable.

SUMMARY

In accordance with one aspect, there is provided a fuel tank, comprising: a body defining a fuel holding cavity therein; a spill box attached to the body; a fill port for fluid communication with the fuel holding cavity, the fill port being disposed within the spill box; and an accumulation box disposed on a top of the body and defining a fuel overflow cavity therein that is in fluid communication with the fuel holding cavity.

In some embodiments, the fuel overflow cavity is dimensioned to have a volume that is in a range of about 5% to about 15% of a volume of the fuel holding cavity.

In some embodiments, the fuel overflow cavity is dimensioned to have a volume that is about 5% of the volume of the fuel holding cavity.

In some embodiments, the fuel tank further comprises a vent conduit that provides fluid communication between the accumulation box and a part of the fuel holding cavity spaced away from the accumulation box.

In some embodiments, the body has a width and a length that is greater than the width, and the part of the fuel holding cavity is located at a distance of at least one half of the length away from the accumulation box.

In some embodiments, the fuel overflow cavity is in fluid communication with the fuel holding cavity via one or more fluid passages between the fuel overflow cavity and the fuel holding cavity.

In some embodiments; the vent conduit includes an open end that opens into the fuel overflow cavity of the accumulation box.

In some embodiments, the part of the fuel holding cavity is an upper portion of the fuel holding cavity.

In some embodiments, the vent conduit extends from the fuel overflow cavity to the upper portion of the fuel holding cavity through the body of the fuel tank.

In some embodiments, the fuel tank further comprises an air vent operatively connected to the fuel overflow cavity, the air vent being configured to open when pressure in the fuel overflow cavity exceeds a threshold.

In some embodiments, the air vent is operatively connected to an upper portion of the fuel overflow cavity, the fill port and the air vent are disposed inside the spill box, and the fill port opens into the fuel holding cavity at a location that is under the accumulation box.

In some embodiments, the fill port includes an open bottom end disposed inside the fuel holding cavity, and the fill port defines at least one of: a first aperture in the fill port that fluidly connects the fill port to the fuel holding cavity, and a second aperture in the fill port that fluidly connects the fill port to the accumulation box.

In another aspect, there is provided a trailer, comprising a wheel-carrying axle and the fuel tank as described in any of the examples above, wherein the fuel tank is supported on the wheel-carrying axle, the body includes a first end portion and a second end portion opposite the first end portion, and the accumulation box and the fill port are disposed on the first end portion.

In some embodiments, the trailer further comprises a generator disposed on the top of the body and occupying at least a majority of the top of the body between the accumulation box and the second end portion, the generator being in fluid communication with the fuel holding cavity for receiving fuel from the fuel holding cavity.

In yet another aspect, there is provided a method of retrofitting a fuel tank having a fill port and a body defining a fuel holding cavity therein, the fill port opening into a first end portion of the fuel holding cavity, the fuel holding cavity having a second end portion opposite the first end portion, the method comprising installing an accumulation box on a top of the body above the first end portion, and fluidly connecting the accumulation box to the fuel holding cavity.

In some embodiments, the accumulation box is between about 5% and about 15% of a volume of the fuel holding cavity.

In some embodiments, method further comprises fluidly connecting the first end portion of the fuel holding cavity to the second end portion of the fuel holding cavity.

In some embodiments, the fluidly connecting the first end portion to the second end portion includes fluidly connecting the accumulation box to the second end portion of the fuel holding cavity.

In some embodiments, the fluidly connecting the accumulation box to the second end portion includes extending a vent conduit through the fuel holding cavity between the accumulation box and the second end portion.

In yet another aspect, there is provided a method of venting a fuel tank, comprising: receiving fuel into the fuel tank via a fill port, and venting an upper rear portion of a fuel holding cavity of the fuel tank to an accumulation box that extends above a top of the front portion of the fuel tank and fluidly connects to the fuel holding cavity, at least when the fuel tank is positioned such that the front portion of the fuel tank is below the upper rear portion of the fuel holding cavity.

In some embodiments, the venting includes permanently venting the upper rear portion of the fuel holding cavity to the accumulation box via a vent conduit.

Many further features and combinations thereof concerning the present improvements will appear to those skilled in the art following a reading of the instant disclosure.

DETAILED DESCRIPTION

Figure 1:
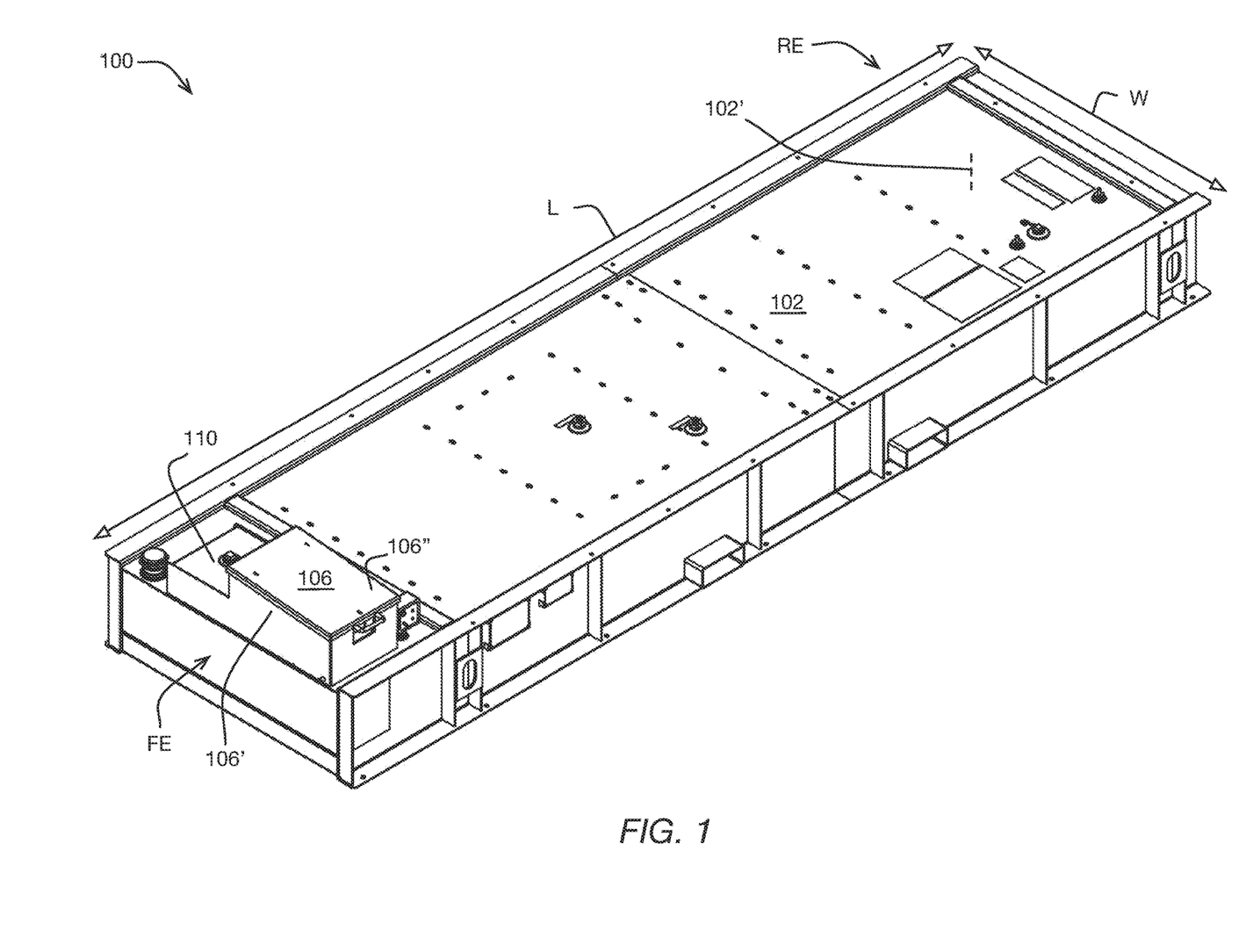
FIG. 1 is a perspective view of an example of a fuel tank.
Figure 2:
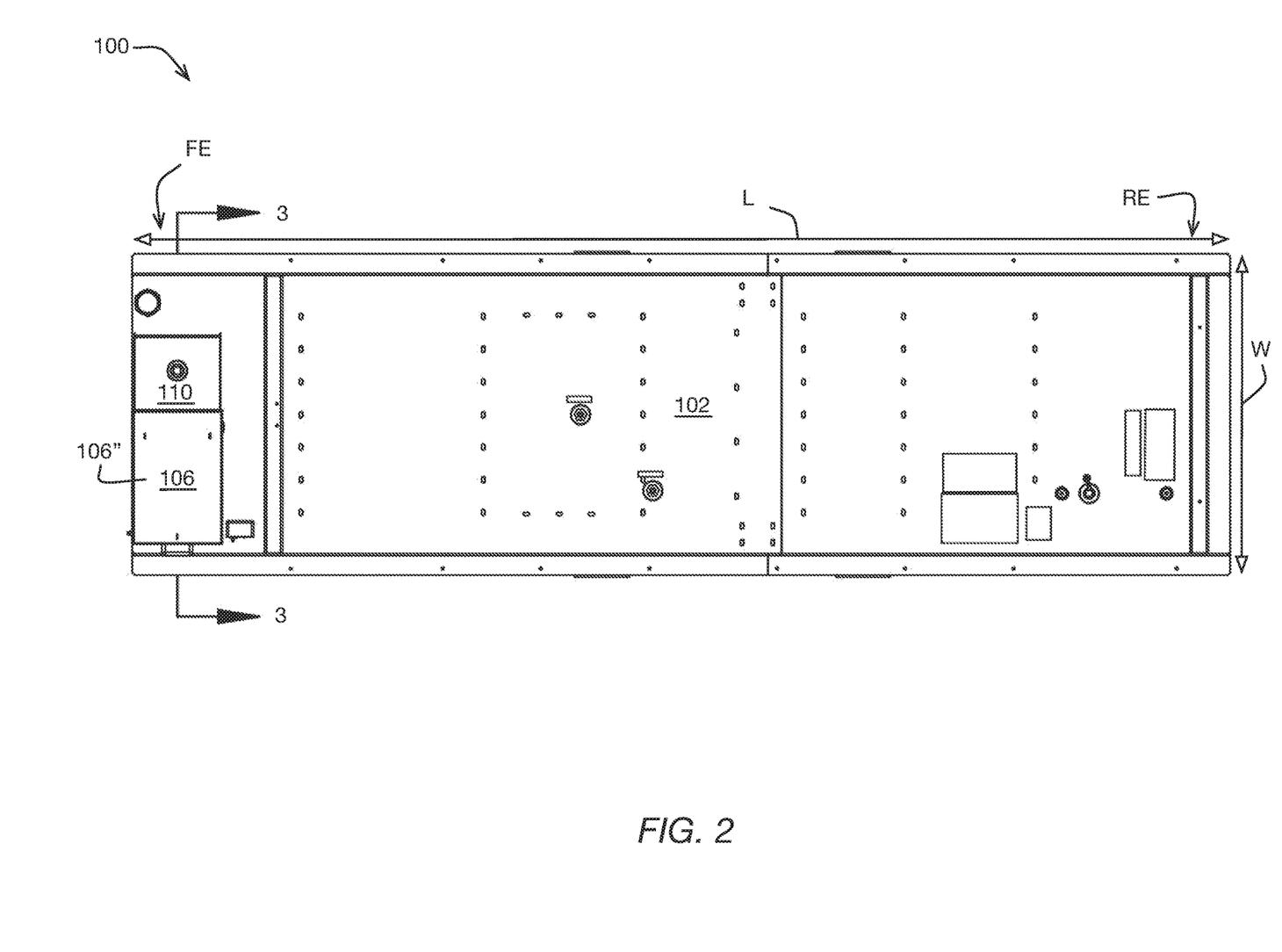
FIG. 2 is a top plan view of the fuel tank of FIG. 1.

FIGS. 1 and 2 show an example of a fuel tank 100. The fuel tank 100 includes a body 102 that defines a fuel holding cavity 104 therein for holding a fuel, such as diesel for example. The body 102 and the fuel holding cavity 104 (FIGS. 3-5) in this embodiment are generally cuboid; however other shapes may also be used. As shown, the body 102 has a width (W) and a length (L) that is greater than the width (W). Also as shown, the body 102 and the fuel holding cavity 104 have a front portion (FE) and a rear portion (RE) opposite the front portion (FE). The body 102 in this non-limiting example is made of stamped and/or bent and/or welded sheet metal; however, any suitable combination of material(s) and/or manufacturing method(s) may be used to suit each particular embodiment and application of the fuel tank 100.

The body 102 includes a fuel conduit 102' that is used to fluidly connect the fuel holding cavity 104 to a fuel destination, such for example as an engine or a generator which is to be fed with fuel from the fuel tank 100. Depending on each particular embodiment, the fuel conduit 102' may be defined by any suitable combination of fuel line(s), fuel filter(s), fuel pump(s), and fuel fitting(s), such as conventional fuel line(s), fuel filter(s), fuel pump(s), and fuel fitting(s), which may be interconnected to deliver fuel from the fuel holding cavity 104 to the fuel destination served by the fuel tank 100. The fuel conduit 102' may have any position relative to the body 102 of the fuel tank 100 which is suitable for each particular embodiment and application of the fuel tank 100. For the foregoing reasons, the fuel conduit 102' is shown schematically.

Figure 3:
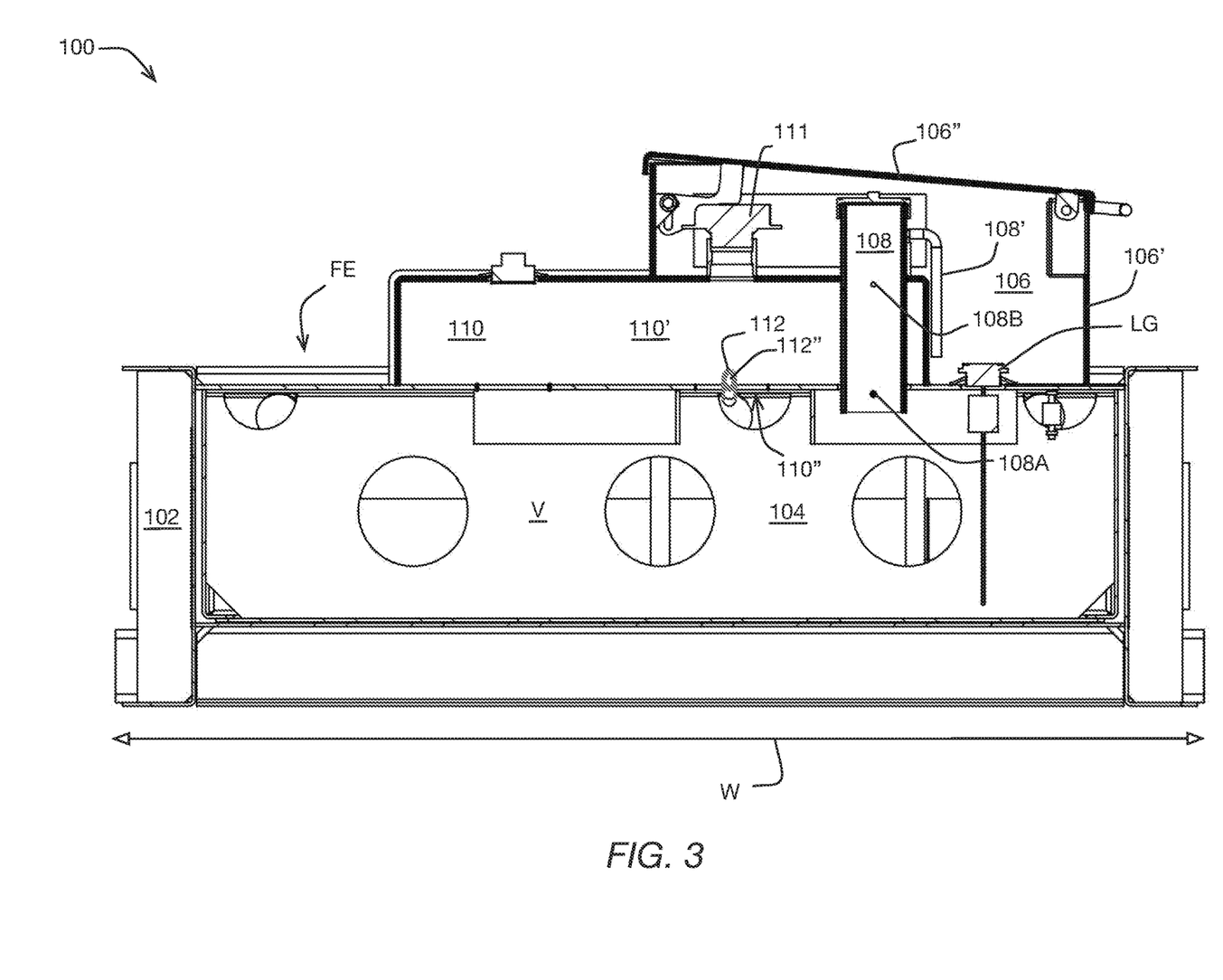
FIG. 3 is a section view of the fuel tank of FIG. 2, taken along section line 3-3 in FIG. 2.

Now also referring to FIG. 3, further in the present embodiment, the fuel tank 100 includes a spill box 106 and a fill port 108. The spill box 106 includes a main body 106' with an open upper end (not labeled) which is covered with an access door 106". The access door 106" is pivotably attached to the main body 106' of the spill box 106 to be pivotable between a closed position (FIG. 3) in which the access door 106" covers the open upper end of the spill box 106, and an open position in which the access door 106" provides access to the open upper end of the spill box 106. A different operative connection between the access door 106" and the main body 106' of the spill box 106 may be used. In this embodiment, the access door 106" is made at least in part of a transparent material, such as glass or plastic for example, and thus provides for visibility into the main body 106' of the spill box 106. In other embodiments, the access door 106" need not have a transparent portion for providing visibility into the main body 106' of the spill box 106.

In this embodiment, the spill box 106 is attached to the body 102 on a top of the body 102, on the front portion (FE) of the body 102. In other embodiments, the spill box 106 may be attached to the body 102 on the top of the body 102, on the rear portion (RE) of the body 102. Similar to the body 102, the main body 106' and the access door 106" of the spill box 106 are made of sheet metal, although any suitable combination of material(s) and/or manufacturing method(s) may be used to suit each particular embodiment and application of the fuel tank 100.

Still referring to FIG. 3, the fill port 108 fluidly connects to the fuel holding cavity 104 to allow for fuel to be added to the fuel holding cavity 104 when the access door 106" is in the open position. The fill port 108 is capped with a conventional removable fuel cap (not labeled); although any other removable closure may be used. In the present embodiment, the fill port 108 is disposed inside the spill box 106, and more particularly within a footprint of the spill box 106 on the top of the body 102. As shown, the fill port 108 is sized such that it and the fuel cap are positioned under and are covered by the access door 106" of the spill box 106 when the access door 106" is in the closed position. In case fuel spills out of the fill port 108, at least some of the fuel will enter and be contained inside the spill box 106, instead of being released into the environment. In this embodiment, a roll over valve 108' fluidly connects the fill port 108 to a bottom of the spill box 106; although in some embodiments the roll over valve 108' may be omitted. Yet further in this embodiment, a lever gauge (LG) is disposed inside the spill box 106 and extends into the fuel holding cavity 104 via an aperture defined through the top of the body 102. In some embodiments the lever gauge (LG) may be omitted.

Yet further in this embodiment, and still referring to FIG. 3, the fill port 108 defines a first aperture 108A and a second aperture 108B in the fill port 108, at locations disposed above an open bottom end of the fill port 108 that opens into and is disposed inside the fuel holding cavity 104. The first aperture 108A is positioned to fluidly connect into the fuel holding cavity 104. The second aperture 108B is positioned to fluidly connect into an accumulation box 110 disposed above the fuel holding cavity 104. In cases when the fuel holding cavity 104 is being filled via the fill port 108 and the level of fuel rises into the fill port 108, and more particularly in this embodiment into the pipe 108 that defines the fill port 108, to a point above the first aperture 108A, the filling of the fuel holding cavity 104 may be stopped so as to not overfill the fuel holding cavity 104.

After the filling is stopped, the first aperture 108A may allow fuel that is in the fill port 108 above and/or at the level of the first aperture 108A to flow back into the fuel holding cavity 104. In cases when the fuel holding cavity 104 is being filled via the fill port 108 and the level of fuel rises into the fill port 108 to a point above the second aperture 108B, the second aperture 108B may allow the fuel that is in the fill port 108 above and/or at the level of the second aperture 108B to flow into the accumulation box 110, and eventually back into the fuel holding cavity 104 via the fluid connection (s) of the accumulation box 110 to the fuel holding cavity 104 as described herein.

In at least some embodiments and applications, the first aperture 108A and the second aperture 108B may help reduce or prevent thermal fuel expansion related fuel spills into the spill box 106 via the fill port 108. In some embodiments, the first aperture 108A and/or the second aperture 108B may be provided in respective fluid conduit(s) or other fluid connections between the fill port 108 and the fuel holding cavity 104. In some embodiments, one or both of the first aperture 108A and the second aperture 108B and/or such fluid connections may be omitted.

Still referring to FIG. 3, in this embodiment, the accumulation box 110 is disposed on top of the body 102, on the front portion (FE) of the body 102. In other embodiments, the accumulation box 110 may be attached to the body 102 on the top of the body 102, on the rear portion (RE) of the body 102. In some embodiments, the accumulation box 110 may be disposed above and may not necessarily contact the body 102, such as by being part of a shell or other part that for example may be attached to the body 102. In the present embodiment, and as shown in FIGS. 1-3, the accumulation box 110 is integrated into the spill box 106. More particularly, in this embodiment a part of the accumulation box 110 is disposed outside of the spill box 106, and another part of the accumulation box 110 extends into and is disposed inside the spill box 106. The fill port 108 traverses the part of the accumulation box 110 that is disposed inside the spill box 106; although this need not be the case. In some embodiments, the fill port 108 may be disposed in its entirety outside of the accumulation box 110. In some embodiments, the accumulation box 110 may be in its entirety disposed inside the spill box 106. In some embodiments, the accumulation box 110 may be in its entirety disposed outside of the spill box 106.

The accumulation box 110 defines therein, and provides a fuel overflow cavity 110'. Similar to the body 102, the accumulation box 110 is made of sheet metal, although any suitable combination of material(s) and/or manufacturing method(s) may be used to suit each particular embodiment and application of the fuel tank 100. An air vent 111 is disposed in a top of the accumulation box 110, and is at one end open into the fuel overflow cavity 110'. The air vent 111 is configured to open into the spill box 106 when pressure in the fuel overflow cavity 110' exceeds a threshold, such as 4 psi for example. To this end, in this embodiment the air vent 111 is disposed inside the spill box 106. In other embodiments, the air vent 111 may at least in part be disposed outside of the spill box 106 and may extend and/or selectively open into the spill box 106 by traversing the main body 106' of the spill box 106 for example. The threshold of the air vent 111 may be selected differently to suit each particular embodiment and application of the fuel tank 100.

The fuel overflow cavity 110' is in fluid communication with the fuel holding cavity 104 by fluid passages 110" that extend from the fuel overflow cavity 110', through the top of the body 102, into the fuel holding cavity 104. It is contemplated that the fuel overflow cavity 110' may be in fluid communication with the fuel holding cavity 104 differently, such as via a single passage 110" and/or via one or more fluid conduits which in at least some embodiments may at least in part extend outside of the accumulation box 110 and/or the spill box 106. In this embodiment, the fuel overflow cavity 110' is about 5% of a volume (V) of the fuel holding cavity 104, and in some embodiments is at least 5% of the volume (V) of the fuel holding cavity 104. At least some jurisdictions require that a given fuel tank not be filled to more than 95% of its fuel capacity, and/or stated otherwise, require at least a 5% air space in any given fuel tank, by volume. For some such jurisdictions, the fuel overflow cavity 110' may allow the fuel holding cavity 104 to be at least substantially (e.g. nearly completely) filled (although this need not be the case), while still meeting the requirements of such jurisdictions. Some jurisdictions may require a larger or a smaller percentage air space in fuel tanks.

It is contemplated that in some embodiments, dimensions of the accumulation box 110 may be selected differently. For example, in some embodiments, the accumulation box 110 may be dimensioned so that the fuel overflow cavity 110' is in a range of about 5% to about 15% of the volume (V) of the fuel holding cavity 104. In some such embodiments, the accumulation box 110 may accommodate at least some fuel that may flow into the accumulation box 110 from the fuel holding cavity 104 via the passage(s) 110" as a result of a temperature rise in the fuel that may cause the fuel to expand. In at least some embodiments and applications, this may reduce or avoid fuel entering the spill box 106 via the fill port 108 and/or the roll over valve 108', depending on a given fill level of the fuel holding cavity 104 and/or the degree of tilt of the body 102 for example. After the fuel temperature drops, fuel in the accumulation box 110 may flow back into the fuel holding cavity 104 by gravity via the passage(s) 110" or other fluid connection(s) connecting the accumulation box 110 to the fuel holding cavity 104. It is contemplated that yet other sizing of the accumulation box 110 may be used.

Figure 4:
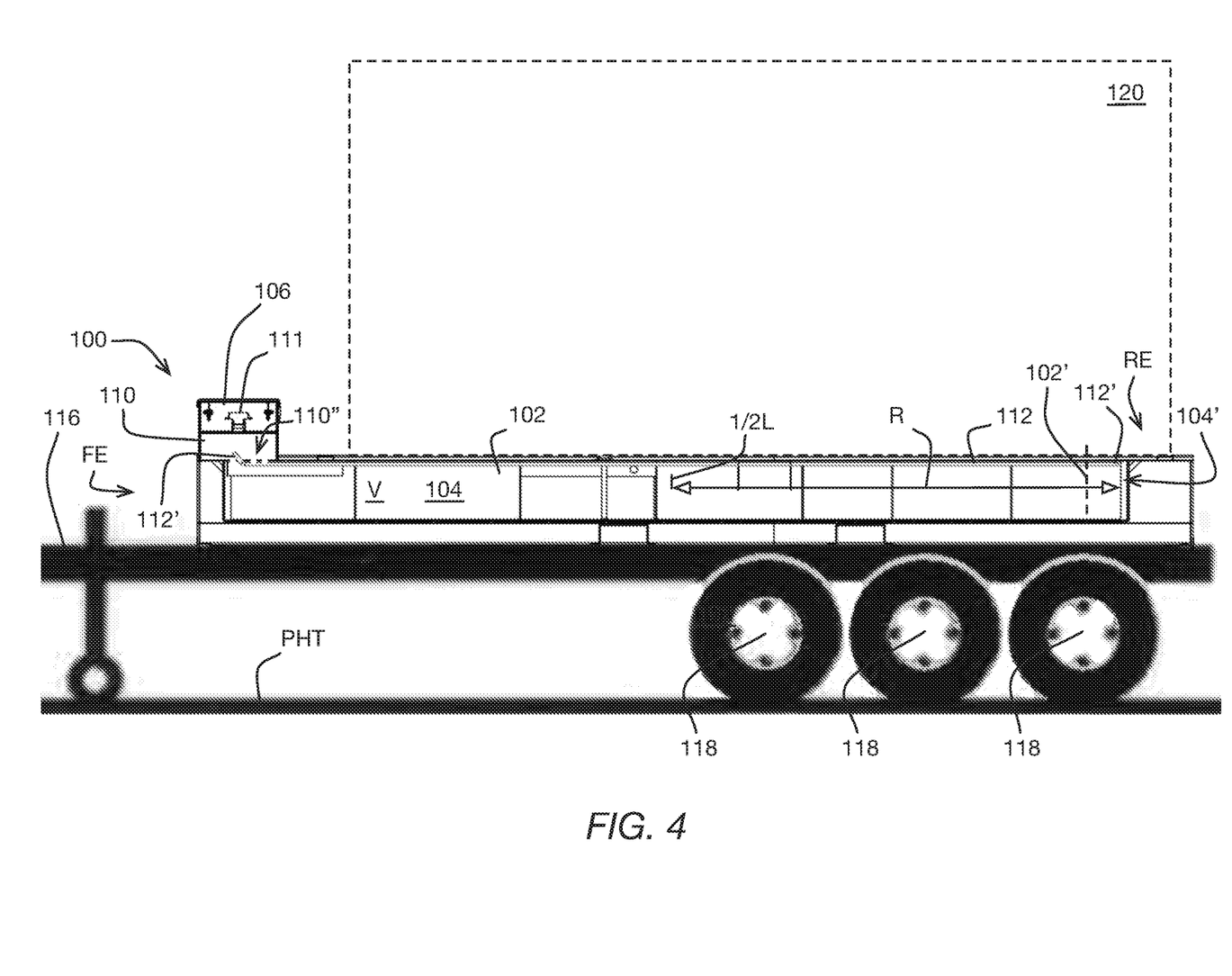
FIG. 4 is a schematic side elevation view of a trailer that includes the fuel tank of FIG. 1, and generator supported by the fuel tank, with the trailer being in a neutral horizontal position.

Now referring to FIG. 4, in this embodiment the fuel tank 100 further includes a vent conduit 112 that extends from the fuel overflow cavity 110' of the accumulation box 110 to a part 104' of the fuel holding cavity 104 that is spaced away from the accumulation box 110. The vent conduit 112 thus provides fluid communication between the accumulation box 110 and the part 104' of the fuel holding cavity 104. In the present embodiment, the vent conduit 112 includes an open end 112' that opens into and/or is disposed inside the fuel overflow cavity 110' of the accumulation box 110, and an open end 112" that is disposed in the spaced-away part 104' of the fuel holding cavity 104. In some embodiments, the open end 112' extends to and is disposed in an upper portion of the fuel overflow cavity 110'. In this embodiment, the vent conduit 112 extends from the fuel overflow cavity 110' into the fuel holding cavity 104 via one of the passages 110" described above, which provides for relatively easier assembly and construction of the fuel tank 100. However, a different routing may be used.

In the illustrated embodiment, the spaced-away part 104' of the fuel holding cavity 104 is an upper portion of the fuel holding cavity 104, at a rear end (which is in the rear portion (RE)) of the fuel holding cavity 104. However, in other embodiments, the part 104' of the fuel holding cavity 104 at least one half of the length (L) of the body 102 away from the accumulation box 110, Stated otherwise, the rear open end 112" of the vent conduit 112 may be located at a distance that is in a range (R) between the rear end of the fuel holding cavity 104 and a point (½L) that is at about one-half of the length (L) of the body 102. In the present embodiment, the vent conduit 112 extends in its entirety through the body 102; however, in other embodiments, the vent conduit 112 may extend at least in part outside of the body 102. In the present embodiment, the vent conduit 112 is defined by a single fuel line; however, any other suitable construction may be used.

Figure 5:
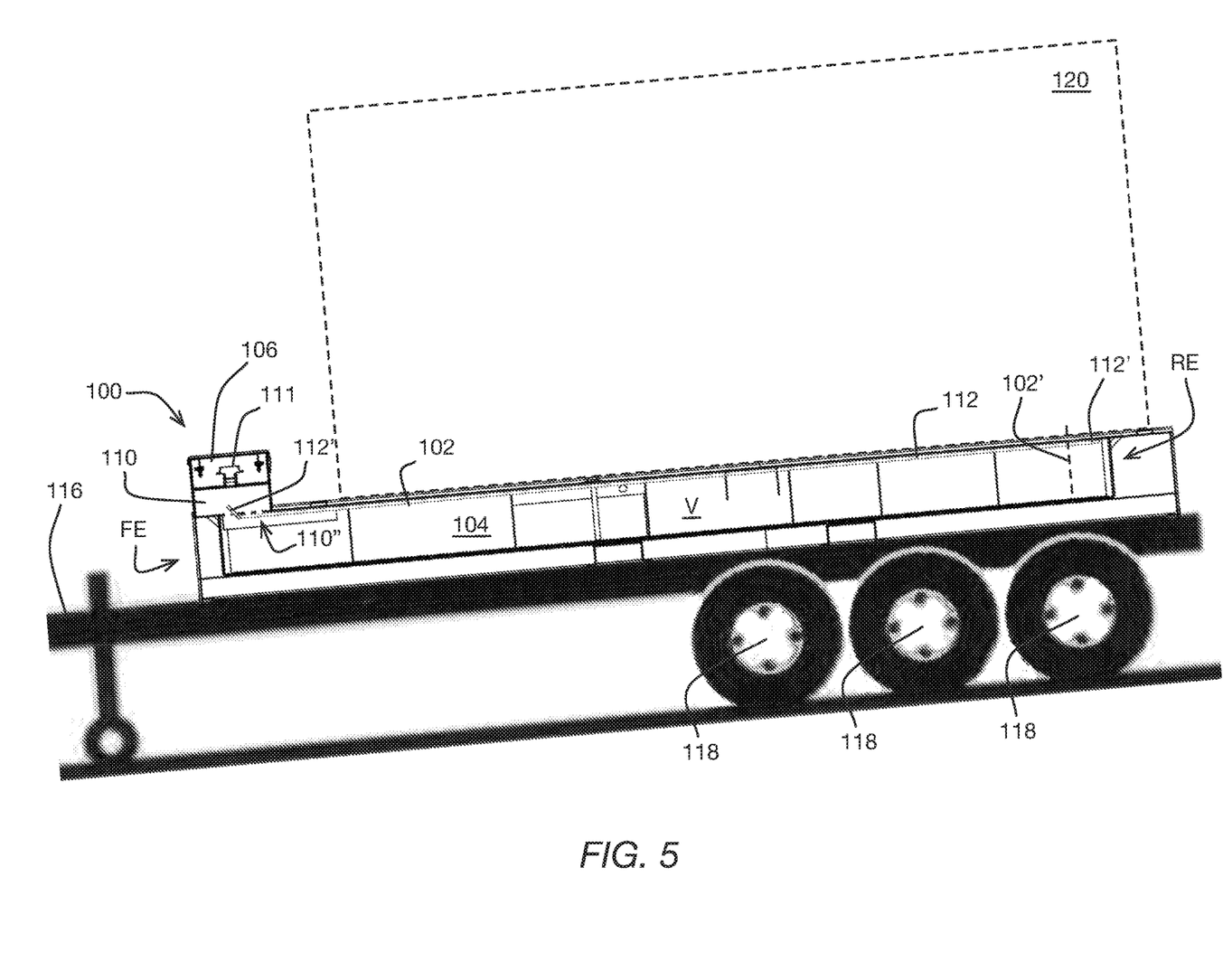
FIG. 5 is a schematic side elevation view of the trailer of FIG. 4, with a front end of the trailer being tilted downward.

In an aspect, the vent conduit 112 helps avoid airlock in the upper, rear portion of the fuel holding cavity 104. Airlock may otherwise occur, for example in the upper rear portion of the fuel holding cavity 104, when the fuel tank 100 is positioned, as shown in FIG. 5 for example, such that the front portion (FE) of the fuel tank 100 is below the upper, rear portion (RE) of the fuel holding cavity 104. In at least some such cases, the vent conduit 112 thereby helps reduce or prevent fuel flowing from the fuel holding cavity 104 into the accumulation box 110 via the passages 110", and/or into the spill box 106 via the fill port 108 and/or the roll over valve 108'. Such leaks may otherwise be caused or exacerbated by pressure which could rise in an air pocket that could occur in the upper, rear portion of the fuel holding cavity 104. In cases where fuel does enter the accumulation box 110, fuel in the accumulation box 110 may flow back into the fuel holding cavity 104 by gravity after a horizontal position (e.g. FIG. 4) of the fuel tank 100 is re-established. In some embodiments, a pump or other liquid evacuation means with suitable corresponding tubing/piping may be provided to assist with and/or provide this flow-back function.

FIGS. 4 and 5 show a particular non-limiting example of an application of the fuel tank 100, in which the fuel tank 100 is supported on a trailer 116. In this example, the trailer 116 is towable. To be towable, the trailer 116 includes a hitch assembly, which may be conventional and is therefore not shown or described in detail. In this example, the trailer 116 includes three wheel-carrying axles 118. Accordingly, the fuel tank 100 is supported on each of the wheel-carrying axles 118. In other embodiments, the trailer 116 may have a fewer number of wheel-carrying axles 118, such as one wheel-carrying axle 118, or a greater number of wheel-carrying axles 118. The body 102 of the fuel tank 100 is dimensioned such that the front portion (FE) of the body 102 is positioned in front of each of the wheel-carrying axles 118, and the rear portion (RE) of the body 102 is positioned behind each of the wheel-carrying axles 118. In an aspect, this dimensioning and positioning provides for advantages in weight distribution and hence in towing characteristics of the trailer 116. However, in other embodiments and/or applications, a different dimensioning and/or positioning of the body 102 may be used.

In the illustrated example application, the body 102 of the fuel tank 100 supports thereon a generator 120. In this particular embodiment, the generator 120 is a conventional generator, but may be an engine or any other fuel-consuming apparatus for example. For each particular application, the body 102 is structured using, for example conventional reinforcing structures and suitable materials, to suitably support thereon the weight of each particular fuel-consuming apparatus. In the present embodiment, the body 102 of the fuel tank 100 is also dimensioned such that the generator 120 occupies at least a majority of the top of the body 102, and is positioned between the accumulation box 110 and the rear portion (RE) of the body 102. Also in this embodiment, the generator 120 is positioned between the spill box 106 and the rear portion (RE) of the body 102. In other embodiments, the spill box 106 may be positioned on the rear portion (RE) of the body 102. In such embodiments, the generator 120 may be between the spill box 106 and the accumulation box 110. In yet other embodiments, the spill box 106 and the accumulation box 110 may be positioned on the rear portion (RE) of the body 102. In such embodiments, the generator 120 may be between: a) the spill box 106 and the accumulation box 110, and b) the front portion (FE) of the body 102.

Still referring to FIGS. 4 and 5, the generator 120 is in fluid communication with the fuel holding cavity 104 of the body 102 for receiving fuel, such as diesel for example, from the fuel holding cavity 104 via the fuel conduit 102' of the fuel tank 100. In embodiments in which the fuel tank 100 supports thereon a different fuel-consuming apparatus, the fuel conduit 102' may be different, such as a different conventional fuel conduit connection that is selected to suit the particular fuel-consuming apparatus and the particular fuel to be used by the fuel-consuming apparatus and to be contained within the fuel holding cavity 104. As shown in FIG. 5, for example when the trailer 116 is towed or positioned facing downward on terrain having a given inclination, the fuel tank 100 of the present technology may help reduce and/or avoid fuel spillage from the fuel holding cavity 104 into the spill box 106, which may occur with prior art fuel tanks of a similar capacity positioned facing downward on terrain having the same given inclination. In some embodiments, the generator 120 may be multiple generators. In some embodiments, the fuel tank 100 may instead be structured to be in a different operative connection with the generator(s) 120, for example by being structured to be disposed on top of the generator(s) 120.

Figure 6:
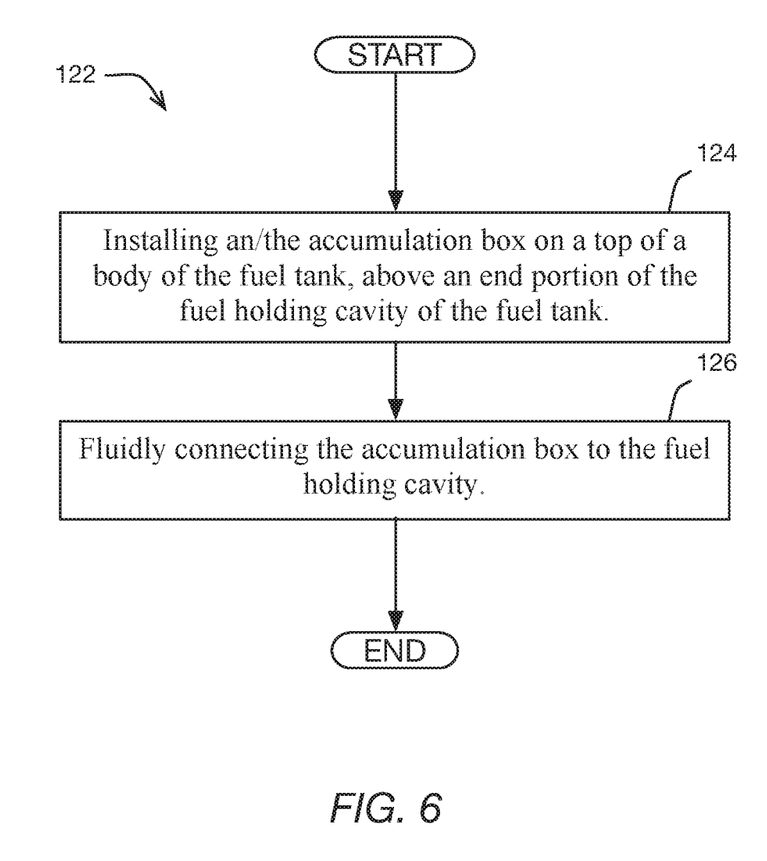
FIG. 6 is a logic flow diagram showing a method of the present technology.

Now referring to FIG. 6, with the above structure in mind, there is provided a method 122 of retrofitting a fuel tank, such as the fuel tank 100, having a fill port 108 and a body 102 defining a fuel holding cavity 104 therein, with the fill port 108 opening into a first end portion (e.g. one of the front portion (FE) and the rear portion (RE)) of the fuel holding cavity 104, and the fuel holding cavity 104 having a second end portion (e.g. the other one of the front portion (FE) and the rear portion (RE)) opposite the first end portion. In some embodiments, the method 122 includes a step 124 of installing an accumulation box 110 on a top of the body 102 above the first end portion, and fluidly connecting the accumulation box 110 to the fuel holding cavity 104. For example, the accumulation box 110 may be constructed by manufacturing a peripheral wall and a top of the accumulation box 110, and attaching, such as by welding, the bottom of the peripheral wall to the top of the body 102. This non-limiting construction example is shown in FIG. 3, described above. As described above, in one non-limiting example, the accumulation box 110 may be fluidly connected with the fuel holding cavity 104 by defining one or more passages 110" through the top of the body 102 at location(s) that is/are within the peripheral wall of the accumulation box 110.

In some embodiments, the method 122 may also include a step of determining a volume (V) of the fuel holding cavity 104 and selecting dimensions for the accumulation box 110 to provide, or simply selecting an accumulation box 110 having dimensions that provide, a fuel overflow cavity 110' that is between about 5% and about 15% of the volume (V) of the fuel holding cavity 104. Stated otherwise, an accumulation box 110 that is between about 5% and about 15% of the volume (V) of the fuel holding cavity 104 may be installed onto the body 102 as described above. In some embodiments, the method 122 may also include a step 126 of fluidly connecting one of the first end portion and the second end portion of the fuel holding cavity 104 to the other one of the first end portion and the second end portion of the fuel holding cavity 104. As seen above, in some cases, the step 126 may be performed by fluidly connecting the accumulation box 110, positioned over one of the first end portion and the second end portion, the other one of the first end portion and the second end portion of the fuel holding cavity 104. As seen above, in some cases, the step 126 may be performed by extending one or more vent conduits 112 between the first end portion and the second end portion, through the fuel holding cavity 104 and/or the body 102.

Figure 7:
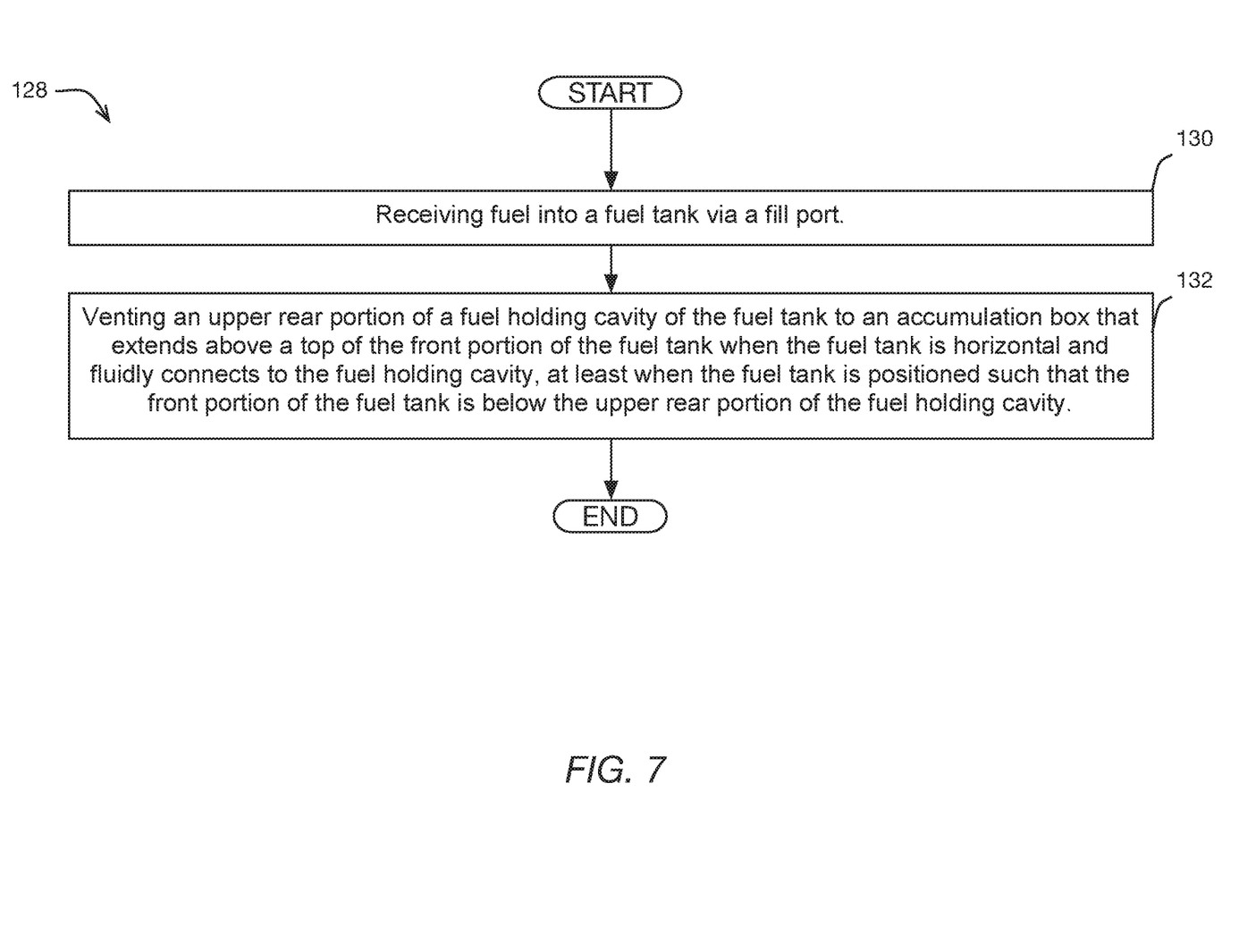
FIG. 7 is a logic flow diagram showing another method of the present technology.

Now referring to FIG. 7, with the above structure in mind, there is also provided a method 128 of venting a fuel tank 100. In some embodiments, the method 128 includes a step 130 of receiving fuel into the fuel tank 100 via a fill port 108, which may be located in a front portion of the fuel tank 100 for example. The method 128 may also include a step 132 of venting an upper rear portion of a fuel holding cavity 104 of the fuel tank 100 to an accumulation box 110 that extends above a top of the front portion of the fuel tank 100, which accumulation box 110 fluidly connects to the fuel holding cavity 104. In some embodiments, the venting step 132 may be executed at least when the fuel tank 100 is positioned such that the front portion (FE) of the fuel tank 100 is below the upper rear portion (RE) of the fuel holding cavity 104. As seen above, in some cases, the venting 132 may be permanently venting via a vent conduit 112. However, it is contemplated that in some embodiments and/or applications, the venting 132 may be executed only when front portion (FE) of the fuel tank 100 is tilted downward (FIG. 5) from a neutral horizontal position (FIG. 4), such as by using suitably configured conventional control valves for example.

The examples described above and illustrated are intended to be non-limiting examples only. For example, while a particular application in a trailer 116 and with a generator 120 is described above, other applications of the fuel tank 100 are also contemplated. Many modifications may be made without departing from the scope of the present disclosure. For example, the fuel tank 100, trailer 116, and generator 120 described above may be made using any suitable materials and/or manufacturing and/or assembly methods.

What is claimed is:

1. A fuel tank, comprising:
    a body defining a fuel holding cavity therein;
    a spill box attached to the body;
    a fill port for fluid communication with the fuel holding cavity, the fill port being disposed within the spill box;
    an accumulation box disposed on a top of the body and defining a fuel overflow cavity therein that is in fluid communication with the fuel holding cavity; and
    a vent conduit defining a closed interior passage and extending between a first end and a second end, the first end of the vent conduit in fluid communication with the fuel overflow cavity of the accumulation box, the second end of the vent conduit in fluid communication with a part of the fuel holding cavity spaced away from the accumulation box, the vent conduit providing fluid communication between the accumulation box and the part of the fuel holding cavity.

2. The fuel tank of claim 1, wherein the fuel overflow cavity is dimensioned to have a volume that is in a range of about 5% to about 15% of a volume of the fuel holding cavity.

3. The fuel tank of claim 1, wherein the fuel overflow cavity is dimensioned to have a volume that is about 5% of the volume of the fuel holding cavity.

4. The fuel tank of claim 1, wherein the body has a width and a length that is greater than the width, and the part of the fuel holding cavity is located at a distance of at least one half of the length away from the accumulation box.

5. The fuel tank of claim 1, wherein the fuel overflow cavity is in fluid communication with the fuel holding cavity via one or more fluid passages between the fuel overflow cavity and the fuel holding cavity.

6. The fuel tank of claim 1, wherein the first end of the vent conduit opens into the fuel overflow cavity of the accumulation box.

7. The fuel tank of claim 1, wherein the part of the fuel holding cavity is a rear portion and an upper portion of the fuel holding cavity.

8. The fuel tank of claim 1, wherein the vent conduit extends from the fuel overflow cavity to an upper portion of the fuel holding cavity through the body of the fuel tank.

9. The fuel tank of claim 1, further comprising an air vent operatively connected to the fuel overflow cavity, the air vent being configured to open when pressure in the fuel overflow cavity exceeds a threshold.

10. The fuel tank of claim 1, further comprising an air vent operatively connected to an upper portion of the fuel overflow cavity, the fill port and the air vent are disposed inside the spill box, and the fill port opens into the fuel holding cavity at a location that is under the accumulation box.

11. The fuel tank of claim 1, wherein the fill port includes an open bottom end disposed inside the fuel holding cavity and an upper end disposed inside the spill box, and the fill port defines at least one of: a first aperture in the fill port disposed closer to the open bottom end than to the upper end that fluidly connects the fill port to the fuel holding cavity, and a second aperture in the fill port disposed closer to the upper end than to the open bottom end that fluidly connects the fill port to the fluid overflow cavity of the accumulation box.

12. A trailer, comprising a wheel-carrying axle and the fuel tank of claim 1, wherein the fuel tank is supported on the wheel-carrying axle, the body includes a first end portion and a second end portion opposite the first end portion, and the accumulation box and the fill port are disposed on the first end portion.

13. The trailer of claim 12, further comprising a generator disposed on the top of the body and occupying at least a majority of the top of the body between the accumulation box and the second end portion, the generator being in fluid communication with the fuel holding cavity for receiving fuel from the fuel holding cavity.

14. The trailer of claim 12, wherein the second end of the vent conduit is disposed at the second end portion of the body and is in fluid communication with the part of the fuel holding cavity at the second end portion of the body.

15. The fuel tank of claim 1, wherein the fill port comprises a valve fluidly connecting the fill port to a bottom of the spill box.

16. A method of retrofitting a fuel tank having a fill port and a body defining a fuel holding cavity therein, the fill port opening into a first end portion of the fuel holding cavity, the fuel holding cavity having a second end portion opposite the first end portion, the method comprising:
    installing an accumulation box on a top of the body above the first end portion; and
    fluidly connecting the accumulation box to the fuel holding cavity by extending a closed vent conduit to be in fluid communication with the accumulation box at the first end portion and to be in fluid communication with the second end portion of the fuel holding cavity.

17. The method of claim 16, wherein the accumulation box is between about 5% and about 15% of a volume of the fuel holding cavity.

18. The method of claim 16, further comprising fluidly connecting the first end portion of the fuel holding cavity to the second end portion of the fuel holding cavity.

19. A method of venting a fuel tank, comprising:
    receiving fuel into the fuel tank via a fill port, and
    venting an upper rear portion of a fuel holding cavity of the fuel tank to an accumulation box that extends above a top of a front portion of the fuel tank and fluidly connects to the fuel holding cavity when the fuel tank is positioned such that the front portion of the fuel tank is below the upper rear portion of the fuel holding cavity.

20. The method of claim 19, wherein the venting includes permanently venting the upper rear portion of the fuel holding cavity to the accumulation box via a vent conduit.

* * * * *